(12) United States Patent
Otto et al.

(10) Patent No.: US 7,977,448 B2
(45) Date of Patent: Jul. 12, 2011

(54) METHOD FOR PRODUCING HIGHLY CONDENSED SOLID-PHASE POLYESTERS

(75) Inventors: Brigitta Otto, Milow (DE); Hans Reitz, Rosbach (DE); Holger Bachmann, Weiterstadt (DE); Klaus Kirsten, Mainz (DE)

(73) Assignee: Lurgi Zimmer GmbH, Frankfurt (DE)

( * ) Notice: Subject to any disclaimer, the term of this patent is extended or adjusted under 35 U.S.C. 154(b) by 577 days.

(21) Appl. No.: 10/591,567

(22) PCT Filed: Feb. 25, 2005

(86) PCT No.: PCT/EP2005/002003
§ 371 (c)(1),
(2), (4) Date: Mar. 21, 2007

(87) PCT Pub. No.: WO2005/085318
PCT Pub. Date: Sep. 15, 2005

(65) Prior Publication Data
US 2007/0179269 A1 Aug. 2, 2007

(30) Foreign Application Priority Data
Mar. 4, 2004 (DE) .................. 10 2004 010 680

(51) Int. Cl.
*C08G 63/00* (2006.01)
(52) U.S. Cl. ............ 528/308.2; 528/271; 528/272; 528/308.3; 528/502 R; 528/503; 264/255; 264/259; 264/54; 264/512; 264/907; 428/542.8; 428/480; 422/131; 422/134; 422/156; 422/608; 422/245.1

(58) Field of Classification Search .......... 528/271, 528/272, 308, 302, 176, 308.1, 308.2, 308.3, 528/308.6, 480, 481, 502 R, 503; 264/255, 264/512, 513, 523, 537, 908, 265, 259, 54, 264/514, 515; 428/542.8, 34.1, 35.7, 480; 422/131, 134, 156, 608, 245.1
See application file for complete search history.

(56) References Cited

U.S. PATENT DOCUMENTS
2,974,126 A 3/1961 Kelley
3,117,950 A 1/1964 Kibler et al.
3,492,283 A 1/1970 Miller
(Continued)

FOREIGN PATENT DOCUMENTS
DE 4131362 3/1993
(Continued)

OTHER PUBLICATIONS
International Search Report for corresponding PCT application, PCT/EP2005/002003 dated Jun. 9, 2005, 6 pages.
(Continued)

*Primary Examiner* — James Seidleck
*Assistant Examiner* — Frances Tischler
(74) *Attorney, Agent, or Firm* — Michael Best & Friedrich LLP

(57) ABSTRACT

The invention relates to a continuous or discontinuous method for the production of highly condensed polyesters in the solid state, comprising a crystallization of a polyester material, wherein the crystallization is carried out in the presence of a gas with a dew point of (less than or equal to) ≦approximately −10° C. The invention also relates to a method for the production of polyester formed bodies using the polyester material obtained for the production of bottles, films and high strength threads.

20 Claims, 3 Drawing Sheets

U.S. PATENT DOCUMENTS

| | | | |
|---|---|---|---|
| 4,064,112 A | 12/1977 | Rothe et al. | |
| 4,161,578 A | 7/1979 | Herron | |
| 4,198,161 A | 4/1980 | Larson | |
| 4,205,157 A | 5/1980 | Duh | |
| 4,223,128 A | 9/1980 | Halek et al. | |
| 4,230,819 A | 10/1980 | Hauenstein et al. | |
| 4,238,593 A | 12/1980 | Duh | |
| 4,327,759 A | 5/1982 | Millis | |
| 4,370,302 A | 1/1983 | Suzuoka et al. | |
| 4,436,782 A | 3/1984 | Ho | |
| 4,584,366 A | 4/1986 | Gerking et al. | |
| 4,710,113 A | 12/1987 | Voigt | |
| 4,728,276 A | 3/1988 | Pauley et al. | |
| 5,090,134 A | 2/1992 | Russemeyer et al. | |
| 5,098,667 A | 3/1992 | Young et al. | |
| 5,292,865 A | 3/1994 | Kerpes et al. | |
| 5,362,844 A | 11/1994 | Kerpes et al. | |
| 5,536,810 A | 7/1996 | Thiele | |
| 5,558,678 A | 9/1996 | Weger | |
| 5,573,820 A | 11/1996 | Harazoe et al. | |
| 5,663,290 A | 9/1997 | Heise et al. | |
| 5,714,571 A | 2/1998 | Al Ghatta et al. | |
| 5,864,005 A | 1/1999 | Kim et al. | |
| 5,968,429 A | 10/1999 | Treece et al. | |
| 6,066,713 A | 5/2000 | Mrose | |
| 6,559,271 B2 | 5/2003 | Schaaf et al. | |
| 7,208,107 B2 | 4/2007 | Jurgens et al. | |
| 7,262,263 B2 * | 8/2007 | Otto et al. | 528/272 |
| 2002/0032300 A1 | 3/2002 | Dowling et al. | |
| 2002/0094402 A1 | 7/2002 | Jen | |
| 2002/0128427 A1 | 9/2002 | Schaaf et al. | |
| 2003/0139543 A1 | 7/2003 | Wilhelm et al. | |
| 2005/0080225 A1 | 4/2005 | Otto et al. | |
| 2006/0165564 A1 | 7/2006 | Cavaglia | |
| 2006/0189783 A1 | 8/2006 | Deiss et al. | |
| 2007/0179269 A1 | 8/2007 | Otto et al. | |
| 2007/0219341 A1 | 9/2007 | Hally | |

FOREIGN PATENT DOCUMENTS

| | | |
|---|---|---|
| DE | 4223197 | 1/1994 |
| DE | 4314162 | 4/1994 |
| DE | 4309227 | 9/1994 |
| DE | 19505680 | 5/1996 |
| DE | 19503053 | 8/1996 |
| DE | 19519898 | 12/1996 |
| DE | 19914116 | 9/2000 |
| DE | 10043277 | 3/2002 |
| DE | 10158793 | 6/2003 |
| DE | 10349016 | 6/2005 |
| EA | 007520 | 10/2006 |
| EP | 0222714 | 5/1987 |
| EP | 0379684 | 8/1990 |
| EP | 0432427 | 6/1991 |
| EP | 0597155 | 5/1994 |
| EP | 0712703 | 5/1996 |
| EP | 0842210 | 5/1998 |
| EP | 0 939 095 | 9/1999 |
| EP | 1 273 610 | 1/2003 |
| JP | 60120839 | 6/1985 |
| JP | 06247899 | 6/1994 |
| JP | 09249744 | 9/1997 |
| JP | 10182802 | 7/1998 |
| JP | 11315137 | 11/1999 |
| RU | 2201943 | 4/2003 |
| WO | WO 94/15991 | 7/1994 |
| WO | 94/17122 | 8/1994 |
| WO | 95/10557 | 4/1995 |
| WO | 98/18847 | 5/1998 |
| WO | 01/05566 | 1/2001 |
| WO | 01/81450 | 11/2001 |
| WO | 02/068498 | 9/2002 |
| WO | WO 03/011940 | 2/2003 |
| WO | WO 03/033581 | 4/2003 |
| WO | 03/046045 | 6/2003 |
| WO | WO 03/085026 | 10/2003 |
| WO | 2004058852 | 7/2004 |
| WO | WO 2004/055093 | 7/2004 |
| WO | 2004/065909 | 8/2004 |
| WO | 2005/044901 | 5/2005 |
| WO | 2005/092949 | 10/2005 |

OTHER PUBLICATIONS

International Preliminary Examination Report for PCT/EP2002/008769, issued by the European Patent Office on Mar. 10, 2004, 4 pages.

United States Patent Office Action for U.S. Appl. No. 10/497,279 dated May 9, 2006 (5 pages).

United States Patent Office Action for U.S. Appl. No. 10/497,279 dated Oct. 16, 2006 (9 pages).

United States Patent Office Action for U.S. Appl. No. 10/543,180 dated Aug. 4, 2008 (7 pages).

United States Patent Office Action for U.S. Appl. No. 10/543,180 dated Dec. 4, 2008 (7 pages).

United States Patent Office Action for U.S. Appl. No. 11/687,180 dated Jul. 7, 2009 (9 pages).

Aldrich Katalog, from "Staerkepfr" to "Stearylalk" (1996) p. 1484-1485.

Whitehead, B.D., "The crystallization and drying of polyethylene terphthalate (PET)," Ind. Eng. Chem. Process Des. Dev. (1977) 16(3):341-346.

United States Patent Office/Advisory Action for U.S. Appl. No. 11/687,180 dated May 3, 2010 (3 pages).

United States Patent Office Action for U.S. Appl. No. 11/687,180, dated Jan. 20, 2010 (11 pages).

* cited by examiner

METHOD FOR PRODUCING HIGHLY CONDENSED SOLID-PHASE POLYESTERS

CROSS-REFERENCE TO RELATED APPLICATIONS

This application is a national stage filing under 35 U.S.C. 371 of International Application No. PCT/EP2005/002003, filed Feb. 25, 2005, which claims foreign priority benefits to German Application No. 10 2004 010 680.0, filed Mar. 4, 2004.

The invention relates to a continuous or discontinuous method for the production of highly condensed polyesters in the solid state, comprising a crystallisation of a polyester material, wherein the crystallisation is carried out in the presence of a gas with a dew point (Tp) of (less than or equal to) ≦approximately −10° C. The invention also relates to a method for the production of polyester formed bodies using the polyester material obtained for the production of bottles, films and high strength threads.

The known aromatic polyesters or copolyesters, in particular polyethylene terephthalate and its copolymers with a slight content of, for example, isophthalic acid or cyclohexane dimethanol, polybutylene terephthalate, polytrimethylene terephthalate, polyethylene naphthalate and its copolyesters, which act as starting material for fibres, films and packaging, are processed after a melt polycondensation to form granulates of medium viscosity. For polyethylene terephthalate and its correspondingly low modified copolyesters, the mean degree of polycondensation, expressed by the Intrinsic Viscosity (I.V.), is in the range between 0.30-0.90 dl/g after the melt polycondensation.

Since the production of granulates with an I.V. over 0.65 dl/g, in particular in conventional autoclaves, is hardly possible and high viscosities >0.80 dl/g involve a substantial reduction of capacity in the melt polycondensation and additionally the polyesters for foodstuff packaging demand a very low acetaldehyde value, then according to the state of the art of melt polycondensation a solid-state polycondensation (SSP) is included, which leads to an increase in the I.V. of generally 0.05-0.4 dl/g and to a reduction of the acetaldehyde content of approx. 25-100 ppm to values <1 ppm in PET (polyethylene terephthalate).

In this solid-state polycondensation following the melt polycondensation stage the mean viscosity is increased such that the strengths required for the corresponding field of application are achieved, the acetaldehyde content with foodstuff packaging is reduced according to requirements and the oligomer content arising is reduced to a minimum level. Here, it is important that in addition the acetaldehyde bound as vinyl ester, also termed depot acetaldehyde, is broken down such that during the processing of the polyester granulate to form packaging, in particular polyester bottles according to the stretch blow and injection stretch blow forming methods, only a minimal amount of acetaldehyde is formed in the polyester. In particular for bottling mineral water in polyester bottles, less than 2 ppm of acetaldehyde should be contained in the bottle wall made from polyethylene terephthalate.

Apart from SSP, methods for aldehyde removal from polyethylene terephthalate by treating with nitrogen or with dry air are known, as described in the U.S. Pat. No. 4,230,819. In order to obtain the required low acetaldehyde content in the material, temperatures of up to about 230° C. are used. When using air, with a high temperature of this nature severe thermo-oxidative breakdown of the polyester must be expected. With the use of nitrogen the gas and the cost-intensive cleaning increase the costs.

In the U.S. Pat. No. 4,223,128 temperatures above 220° C. are eliminated when using air as the carrier gas. The desired increase in the I.V. is obtained with the aid of large amounts of dry air with a dew point of −40 to −80° C. With the treatment temperature of 200° C. given in the examples of this patent, then with continuous methods, which exhibit a more or less wide dwell time range, oxidative damage to individual granulate grains cannot be excluded.

In the SSP a chain extension of the polyester in the solid state is achieved in order to keep the strong secondary reactions arising in a melt as low as possible, as well as removal of the harmful secondary products. With this chain extension, which is expressed as an increase in the I.V., products such as bottles or tyre cord, which require a higher strength, can be produced. Since polyesters are however semicrystalline thermoplastics, then, depending on the type, they exhibit a more or less large amorphous content. This fact gives difficulties with the implementation of the SSP, because, at the temperatures required for the SSP, the amorphous portions lead to conglutination which can even bring the production plant to a halt.

Therefore, it is also known, as a preliminary stage to the SSP, that crystallisation of the semi-crystalline chips from the melt polycondensation can be carried out to prevent the tendency to conglutination under nitrogen or air atmospheres at temperatures between 160-210° C., as described in the U.S. Pat. Nos. 4,064,112, 4,161,578 and 4,370,302.

In WO 94/17122 a two-stage crystallisation with preheating and intermediate cooling before the SSP is disclosed for the prevention of conglutination. The described SSP temperature is located at temperatures between 205 and 230° C.

To improve the quality of the chips, moist inert gas can be used before or during the SSP, as described in JP 09249744 or U.S. Pat. No. 5,663,290, or, as disclosed in the U.S. Pat. No. 5,573,820, the chips can first be treated with hot water or directly with steam intensively at temperatures up to 200° C. before the crystallisation. In this case however, a severe unwanted reduction in the I.V. must be expected due to hydrolysis in the PET already at the usual temperatures of >190° C.

A further method is the treatment of the chips to be crystallised with purified undried nitrogen from the SSP in counterflow in a second crystallisation stage, as shown in EP 222 714. The effect described there for the reduction of the acetaldehyde content is assessed rather as slight.

The known methods therefore have the disadvantage that the use of expensive, optionally purified nitrogen is required, a large amount of equipment must be operated to prevent conglutination, high temperatures must be used, which demand a corresponding expenditure of energy, oxidative damage occurs and a too high acetaldehyde content or too high subsequent acetaldehyde reformation occurs.

The object of the invention is therefore to provide a method for the production of highly condensed polyesters in the solid state from aromatic polyesters and their copolymers, which is simplified in terms of apparatus and at the same time the particularly high quality requirements on the polyester for packaging with regard to viscosity, colour, acetaldehyde content, acetaldehyde reformation and oligomer content are maintained or even improved.

Figure 1:
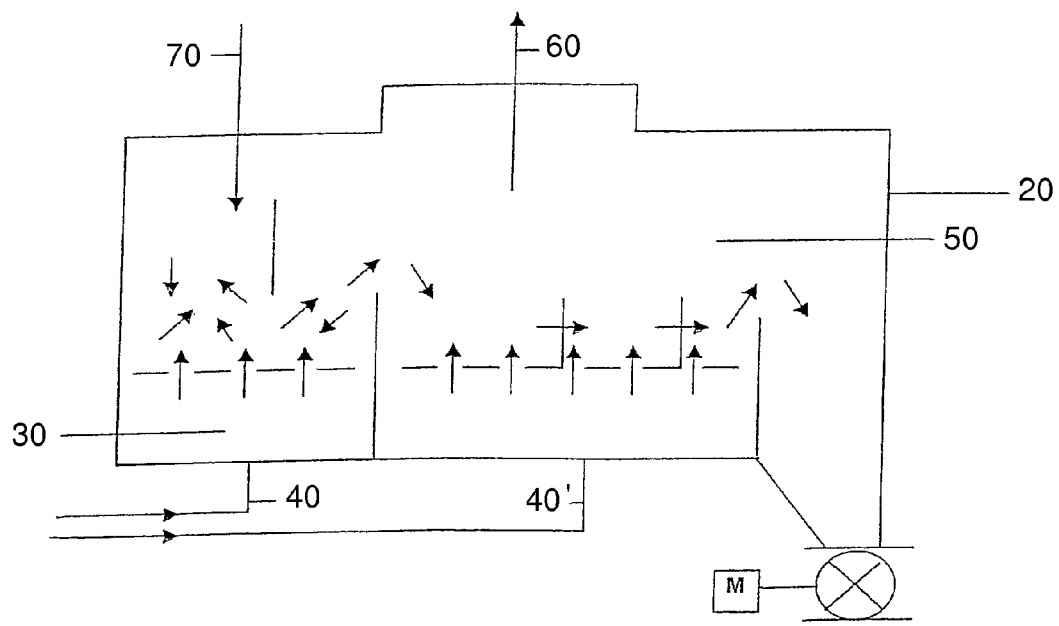
FIG. 1 is a schematic view of an embodiment of a fluidised bed reactor.

The solution of the object is a method of producing polyesters, comprising a crystallisation of a polyester material, wherein the crystallisation is carried out in the presence of a gas with a dew point of (less than or equal to) ≦approximately −10° C.

This method is suitable for the production of granulate of semi-crystalline aromatic polyesters or copolyesters, obtainable from one or more dicarboxylic acids or their methyl esters, such as terephthalic acid, isophthalic acid, naphthalene dicarboxylic acid and/or 4,4-bisphenyl dicarboxylic acid and one or more diols, such as ethylene glycol, propylene glycol, 1,4-butandiol, 1,4-cyclohexane dimethanol, neopentyl glycol, bisphenol A and/or diethylene glycol.

These starting compounds can be processed to form polyester material, preferably granulate, in a known manner according to the continuous or discontinuous method of esterification or re-esterification using known catalysts with a subsequent melt polycondensation under a vacuum.

Preferably polyethylene terephthalate homopolymers and copolymers with a comonomer content of less than 10% by mass are used.

Methods for the production of polyesters generally comprise an esterification or re-esterification, a melt polycondensation stage, crystallisation and optionally a solid state polycondensation. In this way a polyester material is obtained which can be used in further applications, such as the manufacture of formed bodies. Normally, the temperature during the melt polycondensation in the final reactor can be about 265 to about 305° C. and the dwell time about 80 to about 240 min. The usual parameters in the SSP reactor (prior to this is the usual crystallisation stage) are: T=180-230° C.; dwell time=8-18 hours.

The semi-crystalline polyester material is used in the crystallisation. Any polyester material obtained from a melt polycondensation can be used. The polyester material used can have a degree of crystallisation of up to about 8%, preferably about 5% to about 8%.

The dew point of the gas used during the crystallisation in the method according to the invention is preferably in the range from about −10° C. to about −80° C., in particular in the range from about −13° C. to about −78° C. The dew point of the gas is a measure of the water content of the gas. The dew points are referred to a pressure of approximately 1300 mbar. The gas used according to the invention consequently has a water content of less than approximately 1300 ppm, preferably about 1300 ppm to about 0.3 ppm, in particular about 1100 to about 0.3 ppm.

Any commercially available gas can be used for a gas with a desired dew point. Preferably however, the gas is moistened to the desired dew point with a partial flow of the gas, enriched with moisture, from the method for the production of polyesters itself and/or by additional moistening using a gas flow, passed through a wash column, and which is fed again to the main gas flow. The moist gas used from the process (circulating gas) can for this be preferably passed over an existing gas drying system and thus dried. A partial flow of this circulating gas can be branched off via a bypass and fed again to the main flow of the dried circulating gas for the dew point adjustment.

For example, a moist gas from one of the stages of polyester production, such as the esterification or re-esterification, the melt polycondensation and/or the SSP, which for example has a dew point of about −10° C., can be divided into two partial flows. The first partial flow is dried, whereby it has a dew point, for example, of about −70° C. after the drying. The second partial flow is combined with this again after the first partial flow has been dried. In this way, a gas for use according to the invention with a dew point of about −35° C. is obtained.

The gas is preferably air, nitrogen or a mixture of them, in particular nitrogen.

The method according to the invention can be controlled using the adjustment of the gas dew point such that a desired increase in viscosity (I.V.) is achieved during the crystallisation. With increasing dew point and therefore moisture content of the gas the increase in I.V. is less until at a dew point of about −10° C. essentially no further rise in the viscosity occurs. The gas dew point is therefore chosen the lower the higher the rise of the I.V. is to be.

The desired increase in the I.V. is preferably about 0 dl/g to about 0.1 dl/g. With a desired increase in the I.V. of about 0 dl/g to about 0.02 dl/g the dew point of the gas is preferably about −10° C. to about −20° C., with a desired increase in the I.V. of about 0.02 dl/g to about 0.04 dl/g it is about −15° C. to about −25° C., with a desired increase in the I.V. of about 0.04 dl/g to about 0.06 dl/g it is about −20° C. to about −40° C., with a desired increase in the I.V. of about 0.06 dl/g to about 0.08 dl/g it is about −30° C. to about −55° C., with a desired increase in the I.V. of about 0.08 dl/g to about 0.1 dl/g it is about −45° C. to about −75° C.

In a preferred embodiment an I.V. value as low as possible is set in the melt polycondensation and during the crystallisation the rise in the I.V. (final I.V.) is controlled via the Tp. This has been found to be a particularly economical solution. With special applications in which only very low or even no I.V. rises are desired, then a gas is chosen which has a high moisture content, such as with a dew point of about −10° C. to about −15° C. In this way no increase in the I.V. is obtained during the crystallisation and the I.V. remains constant. The acetaldehyde content AA is <1 ppm and the degree of crystallisation is >45%. In this way a polyester material is obtained which is extraordinarily well suited for the following processing into preforms.

In the method according to the invention the crystallisation is preferably carried out at temperatures of about 150° C. to about 230° C., more preferably at about 160-230° C., especially at about 200° C. to about 220° C. The temperature can be continuously increased even during the crystallisation by up to about 20° C., especially about 10° C.

In the method according to the invention the crystallisation is preferably carried out for up to about 10 h, in particular about 2 to about 8 h. The crystallisation can also be carried out preferably shorter, i.e. about 30 to about 120 min., in particular about 50 to about 80 min.

In the method according to the invention the crystallisation is preferably carried out in at least two stages, in particular two stages, as described below. Here, the $1^{st}$ stage of the crystallisation can be carried out at a lower temperature than the $2^{nd}$ stage of the crystallisation. In particular the $1^{st}$ stage of the crystallisation can be carried out at a temperature of about 150° C. to about 210° C. and the $2^{nd}$ stage of the crystallisation carried out at a temperature of about 180° C. to about 230° C.

The dwell time in the $1^{st}$ stage of the crystallisation is preferably up to about 2 h, in particular up to about 1 h and in the $2^{nd}$ stage up to about 8 h, in particular 7-8 h.

The $1^{st}$ stage of the crystallisation can be carried out using a gas flow with turbulence, in particular in a fluidised bed reactor. In the $2^{nd}$ stage of the crystallisation the polyester material can flow (i) under mechanical disturbance and the gas in counterflow, (ii) under mechanical disturbance and the gas in uniflow and (iii) without mechanical disturbance and the gas in uniflow. In addition the $2^{nd}$ stage of the crystallisation can be carried out in a shaft crystalliser.

Any suitable semi-crystalline polyester material in spherical or cylindrical shape can be used as the polyester material in the $1^{st}$ stage of this form of implementation of crystallisation in two stages. The semi-crystalline polyester material can be obtained by the crystallisation of a polyester material obtained from the melt polycondensation. To provide the polyester material in the $1^{st}$ stage of the crystallisation, preferably semi-crystalline polyester material obtained after the melt polycondensation, preferably granulate, can be treated in the $1^{st}$ stage to increase the degree of crystallisation to about 42 to about 50% under turbulence with a gas flow at suitable temperatures and dwell times. Preferred temperatures lie in the range from about 195 to about 210° C. and preferred dwell times are up to about 60 min., preferably about 20 to about 55 min.

The gas used for turbulence is preferably air and/or nitrogen. The gas dew point can vary between −75 to −10° C.

The production of the semi-crystalline polyester material can be carried out using a fluidised bed reactor. The $1^{st}$ stage of the crystallisation is especially preferably carried out in two zones, wherein the crystallisation in the first Zone 1 is carried out in a fluidised bed with a mixed characteristic and in the second Zone 2 in a fluidised bed with a controlled flow of granulate.

FIG. 1 illustrates a preferred embodiment of a fluidised bed reactor 20 with which the crystallinity of a polyester granulate is raised to the desired level, in particular to 40 to 48%. Here, the granulate is passed via a conveying device 10 into a fluidised bed crystalliser 20 with rectangular fluidising areas and with two zones 30, 50 in which the granulate is crystallised under increasing temperatures of 170-210° C., in particular 190-210° C., and gas with a dew point of −10° C. to −78° C., in particular −10° C. to −50° C.

In the first zone the gas/chip ratio can be 2-4 and in the second zone 2-3 with a dwell time of up to 60 min., preferably 20-35 min.

The passage of the gas can be such that the gas is distributed by a perforated panel, enters the first zone 30 via a gas inlet port 40 with a gas speed of 3.2-4 m/s and enters the second zone 50 via a gas inlet port 40' with a gas speed of 2.1-3.5 m/s (free space velocity) and exits again via a common gas outlet 60 in the upper region of the crystalliser 20. This type of gas passage leads in the first zone 30 to a fluidised bed with a mixing characteristic and in the second zone 50 to turbulence with a controlled flow of granulate. The dust content at the outlet of the crystalliser is <20 ppm.

The granulate obtained after the $1^{st}$ stage of the crystallisation has preferably a level of crystallisation in the chip of about 42-50%.

The semi-crystalline polyester material obtained after the $1^{st}$ stage, preferably granulate, flows in a $2^{nd}$ stage at temperatures suitable for crystallisation (i) under low mechanical disturbance and gas in counterflow, (ii) under mechanical disturbance and gas in uniflow and (iii) without mechanical disturbance and gas in uniflow.

The stages (i) to (iii) of the $2^{nd}$ stage of the crystallisation are carried out especially preferably continuously, i.e. the polyester material runs through the stages (i) to (iii) in a continuous flow.

The gas used in the $2^{nd}$ stage (i) to (iii) is preferably air or nitrogen, especially preferably nitrogen.

The temperature suitable in the $2^{nd}$ stage (i) to (iii) for crystallisation is preferably about 190 to about 220° C., more preferably 195 to 215° C. and especially preferably 208 to 213° C.

The dwell time of the polyester material in the $2^{nd}$ stage (i) is preferably about 30 to about 60 min., in the $2^{nd}$ stage (ii) about 30 to about 60 min., and in the $2^{nd}$ stage (iii) about 180 to about 300 min.

Especially preferably the $2^{nd}$ stage of the crystallisation is carried out in three zones of a shaft crystalliser, that is zones 3, 4, 5 in which the steps (i) to (iii) of the $2^{nd}$ stage are carried out. In zone 3 the granulate is subjected to periodically occurring mechanical disturbances with gas in counterflow, in zone 4 to periodically occurring mechanical disturbances with gas in uniflow and in zone 5 to no mechanical disturbances and gas in uniflow.

Figure 2:
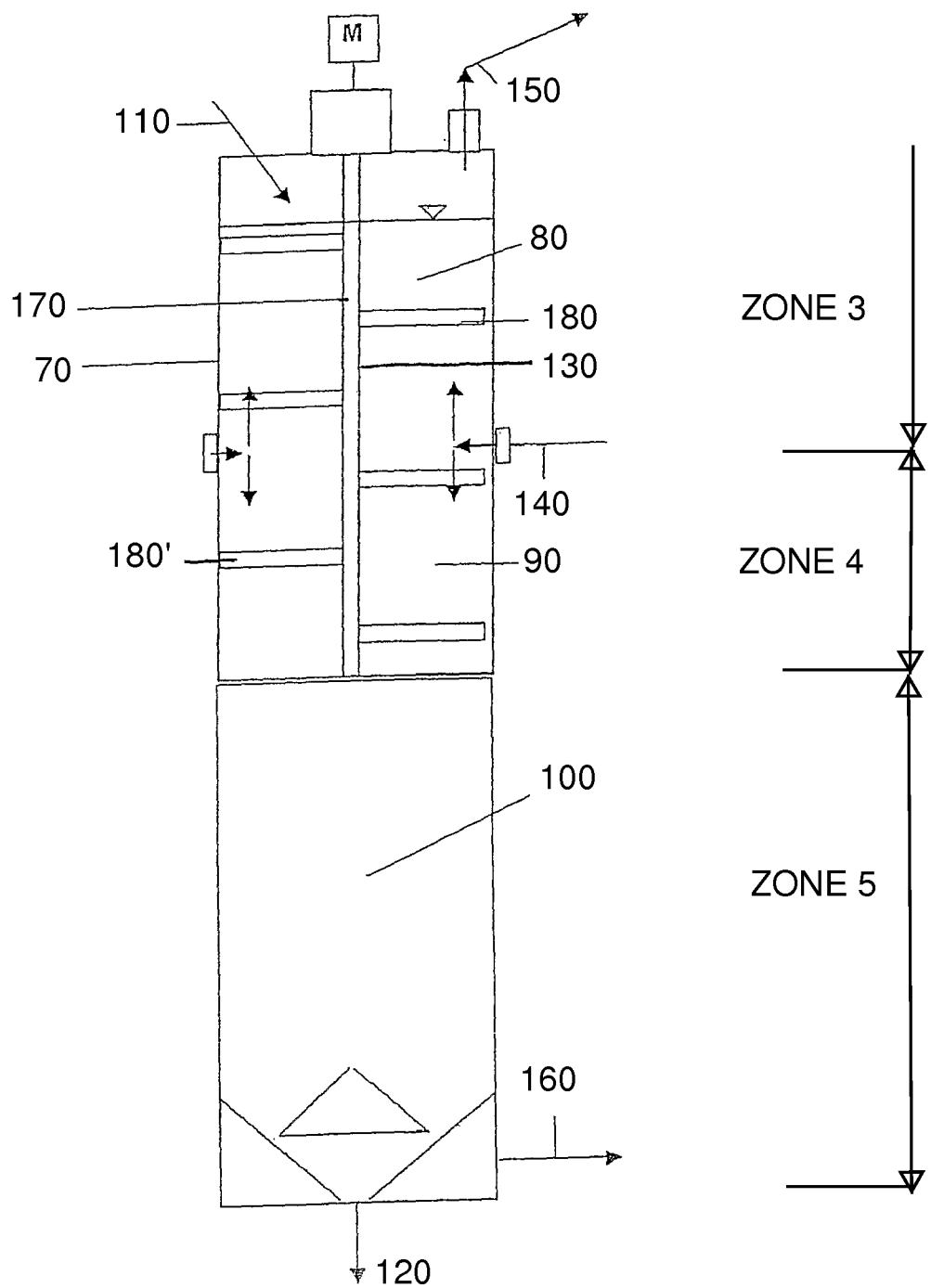
FIG. 2 is a schematic view of an embodiment of a shaft crystallizer.

FIG. 2 illustrates a preferred embodiment of a shaft crystalliser 70, which can be used according to the invention, and in which the $2^{nd}$ stage of the crystallisation can be carried out. As shown in FIG. 2, the granulate is introduced in the 2nd stage into a continuously operating, vertically standing, three-part shaft crystalliser 70 with a centralised rotating shaft 170 which is installed in the longitudinal axis. In the first and second section 80, 90 of the shaft crystalliser, zones 3 and 4, arms 180, 180' with a slight resistance to the flow are fitted at certain intervals to the shaft, through which a periodic mechanical disturbance of the bulk material is achieved. Due to the granulate movement agglomerate formation (conglutination) of the material is prevented. In the third section 100 of the shaft crystalliser the granulate is treated in zone 5 without disturbance.

In the $3^{rd}$ and $4^{th}$ zones the granulate is periodically mechanically disturbed, whereas in the $5^{th}$ undisturbed zone dwell period compensation occurs with the beginning post-polycondensation.

The gas passage occurs such that the gas between the $3^{rd}$ and the $4^{th}$ zones (first and second sections of the shaft crystalliser) is fed via a gas inlet port 140 and exits the crystalliser again in the upper or first section 80 via a gas outlet port 150 and proportionately also via the lower or third section 100 via a gas outlet port 160. Here, the gas is passed to the $3^{rd}$ zone (first section of the shaft crystalliser) in counterflow to the granulate and to the $4^{th}$ and $5^{th}$ zones in uniflow (second and third sections of the shaft crystalliser).

The gas outlet ports (150, 160) are here preferably arranged such that gas introduced through the gas inlet port (140) is passed as long as possible with granulate in counterflow or uniflow, i.e. at the start of the first section (80) and the end of the third section (100) of the shaft crystalliser (70).

In the $3^{rd}$ zone (first section 80 of the shaft crystalliser 70) the PET granulate is heated up under periodically acting mechanical disturbance, preferably using hot gas, in particular nitrogen, in counterflow to the granulate with a gas/chip ratio of 1-3 and dwell time of 30-60 min. to 190-220° C.

In the $4^{th}$ zone (second section 90 of the shaft crystalliser 70) the PET is further crystallised and rendered uniform under the periodic action of mechanical disturbance preferably at 190-220° C. with the gas, in particular nitrogen, in uniflow with a gas/chip ratio of 0.5-1. The dwell time is 30-60 min.

The PET granulate treated in this way in the $3^{rd}$ and $4^{th}$ zones is preferably treated in the undisturbed $5^{th}$ zone (section 100 of the shaft crystalliser 70) at a temperature of 190-215° C. in uniflow with a gas/chip ratio of 0.1-3 in such a way that with a mean dwell time of 60-180 min., apart from aldehyde reduction and crystallisation, a post-polycondensation between 0-0.10 dl/g I.V. increase specifically occurs here according to the method of the invention in dependence of the moisture of the gas.

In the $3^{rd}$ and $4^{th}$ zones the granulate is periodically mechanically disturbed, whereas in the $5^{th}$ undisturbed zone dwell period compensation occurs with the beginning post-polycondensation.

The gas passage occurs such that the gas between the $3^{rd}$ and the $4^{th}$ zones (first and second sections of the shaft crystalliser) is fed via a gas inlet port and exits the crystalliser again in the upper or first section via a gas outlet port and proportionately also via the lower or third section via a gas outlet port. Here, the gas is passed to the $3^{rd}$ zone (first section of the shaft crystalliser) in counterflow to the granulate and to the $4^{th}$ and $5^{th}$ zones in uniflow (second and third sections of the shaft crystalliser).

The gas outlet ports are here preferably arranged such that gas introduced through the gas inlet port is passed as long as possible with granulate in counterflow or uniflow, i.e. at the start of the first section and the end of the third section of the shaft crystalliser.

The overall dwell time of the polyester material in the $1^{st}$ and $2^{nd}$ stages of the crystallisation is preferably, if it comprises the above described zones 1 to 5, between 290-480 min., in particular 350-450 min., wherein the dwell time ratio in the $1^{st}$ stage is in comparison to the dwell time in the second stage 1:4 to 1:21. Especially preferably the dwell time ratio in the $1^{st}$ and $2^{nd}$ stages of the crystallisation, if these stages comprise the zones 1 to 5, amounts to a dwell time in zones 3 and 4, which is 1 to 6 times as long as in the zones 1 and 2 and a dwell time in zone 5, which is 1.5 to 5 times as long as in the zones 3 and 4.

The polyester material used in the method according to the invention preferably has an I.V. of about 0.3 dl/g to about 0.9 dl/g, preferably about 0.3 dl/g to 0.8 dl/g, especially preferably about 0.66 dl/g to 0.9 dl/g in particular about 0.72 to 0.8 dl/g. Especially preferably a polyester material is used which has an I.V. of at least about 0.66 dl/g, more preferably about 0.66 to 0.8 dl/g and in particular about 0.72 to 0.8 dl/g, because the material obtained here exhibits a desired low content of acetaldehyde, i.e. <10 ppm, in particular <1 ppm, and is therefore suitable for further processing to polyester formed objects for which a low acetaldehyde content is required, such as bottles, without a following SSP.

Surprisingly, it has been found that on carrying out the method according to the invention the I.V. of the polyester material can be controlled using the moisture in the gas and therefore a granulate can be specifically produced which conforms to the appropriate bottle applications, wherein a granulate with a high I.V. can be used.

If polyester material with an I.V. of at least about 0.3 dl/g to about 0.72 dl/g is used, preferably an SSP is carried out afterwards.

Since semi-crystalline polyester during the crystallisation in the crystalliser and in the following solid state polycondensation reactor can tend to increased agglomerate formation due to high exothermic heat development and these conglutinations can be so strong that they do not part from one another with the use of normal crystallisation and solid state polycondensation methods, it is preferable to use spherically shaped polyester material in the method according to the invention. However, also other shapes of granulate can be used, such as cylindrical or flake-shaped granulate.

Cylindrical granulates are however not preferred, because they stick together easier due to the surfaces and edges and the abrasion is greater. Due to the asymmetry of cylindrical chips, uniform crystallisation of from the surface to the core of the chip is difficult. The use of approximately spherical chips has the advantage in comparison to the equivalent cylindrical chip of a more uniform crystallisation, a standard molar mass distribution in the chip and a 5-10% higher bulk weight. A further significant advantage with the use of spherical chips is the lower dust content that arises.

Especially preferably the granulate used has a surface area of 1.45-2.0 m²/kg, preferably 1.6 to 1.8 m²/kg.

The granulate obtained with the method according to the invention preferably has a standard degree of crystallisation of about 53 to about 55%, preferably 54%.

The granulate obtained according to the invention preferably has an acetaldehyde content of <10 ppm, especially preferably 0.5-5 ppm and in particular <1 ppm.

The dust content of the granulate is <20 ppm, preferably after crystallisation according to the invention <10 ppm.

It has surprisingly been found that with the use of the method according to the invention with the use of a gas with a dew point of less than or equal to −10° C., in particular through the use of fluidised bed and shaft crystallisation, a polyester granulate can be produced with a low acetaldehyde value, low acetaldehyde reformation, excellent colour brightness, very low dust values, without conglutinations and with the use of chips with high I.V. between 0.66-0.90 dl/g from the melt polycondensation, wherein a following solid state polycondensation can be omitted. Additionally, the acetaldehyde content can be reduced from 50-30 ppm to 5-7 ppm.

This invention also relates to a method for the production of polyester formed bodies, wherein polyester material is used, in particular granulate, obtained following the method according to the invention with an I.V. increase of between 0-0.10 dl/g without solid state polycondensation. Following the method according to the invention polyester material can be used for the production of the polyester formed bodies without carrying out a solid state polycondensation, which is advantageous due to reduced costs and reduced apparatus and energy requirements.

In particular polyester material, in particular in the form of granulate or chips, produced by the method according to the invention and with an I.V. from the melt polycondensation of >0.66 dl/g, can be passed directly for processing in stretch-blow or injection stretch-blow methods for the production of the polyester formed bodies without further condensation in a solid state polycondensation reactor. The special advantage lies in the clearly improved melting properties during the processing of the granulates to preforms.

The required melt energy has values below 56 kJ/kg, preferably 50-52 kJ/kg. The melting point, measured according to DSC without prior melting (DSCO), is at 242-244° C. in a very favourable range for the processing to preforms and bottles.

The polyester formed bodies are preferably selected from the group consisting of bottles, films, filaments, fibres and technical high strength threads.

The invention will now be described in more detail based on some embodiments which in no way restrict the invention. The stated characteristic values were determined in this respect as follows:

The intrinsic viscosity (I.V.) was measured at 25° C. on a solution of 500 mg of polyester in 100 ml of a mixture of phenol and 1,2-dichlorobenzene (3:2 parts by weight).

The COOH end-group concentration was found by photometric titration with 0.05 ethanolic potassium hydroxide against bromthymol blue of a solution of a polyester in a mixture of o-creosol and chloroform (70:30 parts by weight).

The determination of diethylene glycol (DEG), isophthalic acid (IPA) and 1,4-cyclohexane dimethanol (CHDM) in the polyester occurs using gas chromatography after prior methanolysis of 1 g of polyester in 30 ml of methanol with the addition of 50 mg/l of zinc acetate in the bomb tube at 200° C.

The measurement of the turbidity value in "nephelometric turbidity units" (NTU) occurred in a 10% solution by weight of polyester in phenol/dichlorobenzene (3:2 parts by weight) with a nephelometer from Hach (type XR according to U.S. Pat. No. 4,198,161) in a cuvette with 22.2 mm diameter analogous to the usual standard DIN 38404, Part 2 for water. The intensity of the scattered light is measured in comparison to a standard solution of formazine, subtracting the value of the solvent (about 0.3 NTU).

The measurement of the colour values L and b occurred according to HUNTER. The polyester chips were first crystallised in a drying cabinet at 135±5° C. for one hour. The colour values were then found in a three range colour measurement instrument by measuring the colour shade of the polyester sample with three photocells, in the front of each of which was placed a red, green and blue filter (X, Y and Z values). The evaluation occurred according to the HUNTER formula, whereby $$L = 10\sqrt{Y} \text{ and}$$
$$b = \frac{7.0}{\sqrt{Y(Y - 0.8467Z)}}.$$

The acetaldehyde content (AA) was determined by driving the acetaldehyde out of the polyester by heating in an enclosed vessel and the acetaldehyde in the gas space of the vessel was measured by gas chromatography using the Head Space-Injection System H540 from Perkin Elmer; carrier gas: nitrogen; column: 1.5 m stainless steel; filling: Poropack Q, 80-100 mesh; sample amount: 2 g; heating temperature: 150° C.; heating period: 90 min.

The dust analysis is carried out gravimetrically. To do this, 1 kg of chips is washed with methanol, the washing agent filtered via a filter and the residue dried and weighed.

The product is weighed in and heated to 300° C. from a starting temperature around 35° C. with a heating rate of 10 K/min. and then the melting point and the melting energy needed for the melting process determined (DSCO—corresponds to the DSC (Differential Scanning Calorimetry) method, without however prior melting of the sample).

The oligomer determination in the PET takes place by dissolution in a mixture of 1,1,1,3,3,3-hexafluoro-2-propanol (HFIP)/chloroform. The high molecular PET is precipitated using methanol, filtered off and the solution dried under a vacuum. Then the oligomer residue is again dissolved in a standard solution, consisting of toluol in HFIP/chloroform and the oligomer content is determined by gel permeation chromatography (GPC).

To determine the degree of crystallisation (KTG) the density of 30 chips is determined three times in a density gradient with a tetrachloroethane/heptane mixture at 23° C. and calculated according to The determination of the melting enthalpy (Heat of Fusion; HOF) occurs separately from the DSCO analysis such that the PET charge is heated in 50 K steps to 200° C., held 5 min. and then heated at 10 K/min. to 300° C. and the energy consumed is determined in kJ/kg.

EXAMPLE 1

Comparison

In Example 1 amorphous spherical chips with a weight of 15.5 mg/chip and with a surface area of 1.55 $m^2$/kg, a bulk weight of 840 kg/$m^3$ and an I.V. of 0.612 dl/g from the melt polycondensation method for the production of lightly modifiable PET for bottles for the bottling of sweet beverages are crystallised and solid state polycondensed.

Materials in Example 1

Catalyst content Sb: 200 ppm, IPA: 2% mass, DEG: 1.4% mass

The results of Example 1 are shown in Table 1 and the results of Examples 2-4 in Tables 2-4 and in Appendix 1.

TABLE 1

Example 1
(Standard crystallisation with following SSP, dew point −75° C. in the SSP reactor)

| Analyses | Material used Spherical chip shape | 1st crystallisation (Zones 1 and 2) Fluidised bed crystalliser DT: 60 min. T: 200° C. | 2nd crystallisation Shaft crystalliser (Zones 3 to 5) DT: 180 min. T: 215° C. | SSP DT: 12 hrs. T: 207.5° C. Delta I.V. = 0.240 [dl/g] |
|---|---|---|---|---|
| I.V. [dl/g] | 0.60 | 0.62 | 0.64 | 0.84 |
| COOH [mmol/kg] | 30 | 27 | 26 | 26 |
| DSCO [° C.] | — | — | — | 244 |
| Colour L | 83 | 85.1 | 88.1 | 89.4 |
| Colour b | −3.3 | −1.0 | −0.6 | −0.6 |
| AA [ppm] | 55 | 8.8 | 1 | 0.2 |
| KTG [° C.] | — | 46.1 | 53.1 | 55.2 |
| HOF [kJ/kg] |  |  |  | 58.6 |
| Oligomers [%] | — |  |  | 0.6 |
| Dust [ppm] | <10 | — | — | <20 |

In Examples 2-4 amorphous spherical chips with a weight of 14 mg/chip and with a surface area of 1.61 $m^2$/kg, a bulk weight of 880 kg/$m^3$ and an I.V. of 0.74-0.76 dl/g were used from the melt polycondensation method following the method according to the invention.

In Example 2 these chips were crystallised at a dew point of −75° C., −30° C. and −15° C. in the carrier gas nitrogen with a dwell time 7.6 hours at temperatures between 205 and 213° C.

Materials used in Example 2:

Catalyst content Sb: 250 ppm, IPA: 2% mass, DEG: 1.4% mass

EXAMPLE 2

TABLE 2

Example 2
(crystallisation at a dew point of −75/−30/−15° C. in the gas circulation)

| Analyses | Material used Spherical chip shape | 1st crystallisation (Zones 1 and 2) Fluidised bed crystalliser DT: 52 min. T: 205° C. Tp gas −75/−30/ −15° C. | 2nd crystallisation (Zones 3 to 5) Shaft crystalliser DT: 403 min. T: 213° C. Tp gas −75/−30/−15 ° C. |
|---|---|---|---|
| I.V. [dl/g] | 0.76 | 0.73-0.74 | 0.87/0.82/0.76 |
| COOH [mmol/kg] | 25 | — | 14/19/20 |
| DSCO [° C.] | — | — | 243/242/239 |
| Colour L | 81 | — | 85 |
| Colour b | −3 | — | 0-0.5 |
| AA [ppm] | 42 | 5-6 | 0.7/0.6/0.5 |
| KTG [° C.] | — | 48-50 | 54 |
| HOF [kJ/kg] | — | — | 57.5/54.2/54.3 |
| Oligomers [%] | — | — | 0.8 |
| NTU | 6.5 | — | 2-4 |
| Dust [ppm] | <10 | — | 13.7 |

In a further Example 3 amorphous spherical chips were crystallised following the method according to the invention at a dew point of −39° C., −30° C., −17° C. in the carrier gas nitrogen, with a dwell time of 7.6 hours at temperatures between 205 and 213° C.

Material used in Examples 3 and 4:

Catalyst content Sb: 220 ppm, IPA: 2% mass, DEG: 1.4% mass

EXAMPLE 3

TABLE 3

Example 3
(crystallisation at a dew point of −39/−30/−17° C. in the gas circulation)

| Analyses | Material used Spherical chip shape | 1st crystallisation (Zones 1 and 2) Fluidised bed crystalliser DT: 52 min. T: 205° C. Tp gas −39/−30/ −17° C. | 2nd crystallisation (Zones 3 to 5) Shaft crystalliser DT: 403 min. T: 213° C. Tp gas −39/−30/ −17° C. |
|---|---|---|---|
| I.V. [dl/g] | 0.74-0.75 | 0.73-0.74 | 0.82/0.80/0.76 |
| COOH [mmol/kg] | 20 | — | 15/17/22 |
| DSCO [° C.] | — | — | 243/240/240 |
| Colour L | 80 | — | 86 |
| Colour b | −3 | — | 0-0.5 |
| AA [ppm] | 35 | 5 | 0.5-0.6 |
| KTG [° C.] | — | 48-50 | 55 |
| HOF [kJ/kg] | — | — | 54-56 |
| Oligomers [%] | — | — | 0.9-1.0 |
| NTU | 3-5 | — | 2 |
| Dust [ppm] | <10 | — | 15.4 |

In Example 4 amorphous spherical chips were crystallised following the method according to the invention at a dew point of −39° C. in the carrier gas nitrogen, with a reduced dwell time of 6.7 hours at temperatures between 205 and 213° C.

EXAMPLE 4

TABLE 4

Example 4
(crystallisation at a dew point of −39° C. in the gas circulation with reduced dwell time)

| Analyses | Material used Spherical chip shape | 1st crystallisation (Zones 1 and 2) Fluidised bed crystalliser DT: 46 min. T: 205° C. Tp gas −39° C. | 2nd crystallisation (Zones 3 to 5) Shaft crystalliser DT: 353 min. T: 213° C. Tp gas −39° C. |
|---|---|---|---|
| I.V. [dl/g] | 0.74 | 0.73 | 0.81 |
| COOH [mmol/kg] | 20 | — | — |
| DSCO [° C.] | — | — | — |
| Colour L | 81 | — | 86 |
| Colour b | −3 | — | −0.5 |
| AA [ppm] | 32 | 7 | 0.6 |
| KTG [° C.] | — | 48 | 54 |
| HOF [kJ/kg] | — | — | 52.4 |
| Oligomers [%] | — | — | 1.03 |
| NTU | 3.3 | — | 4.1 |
| Dust [ppm] | <10 | — | 11.9 |

Figure 3:
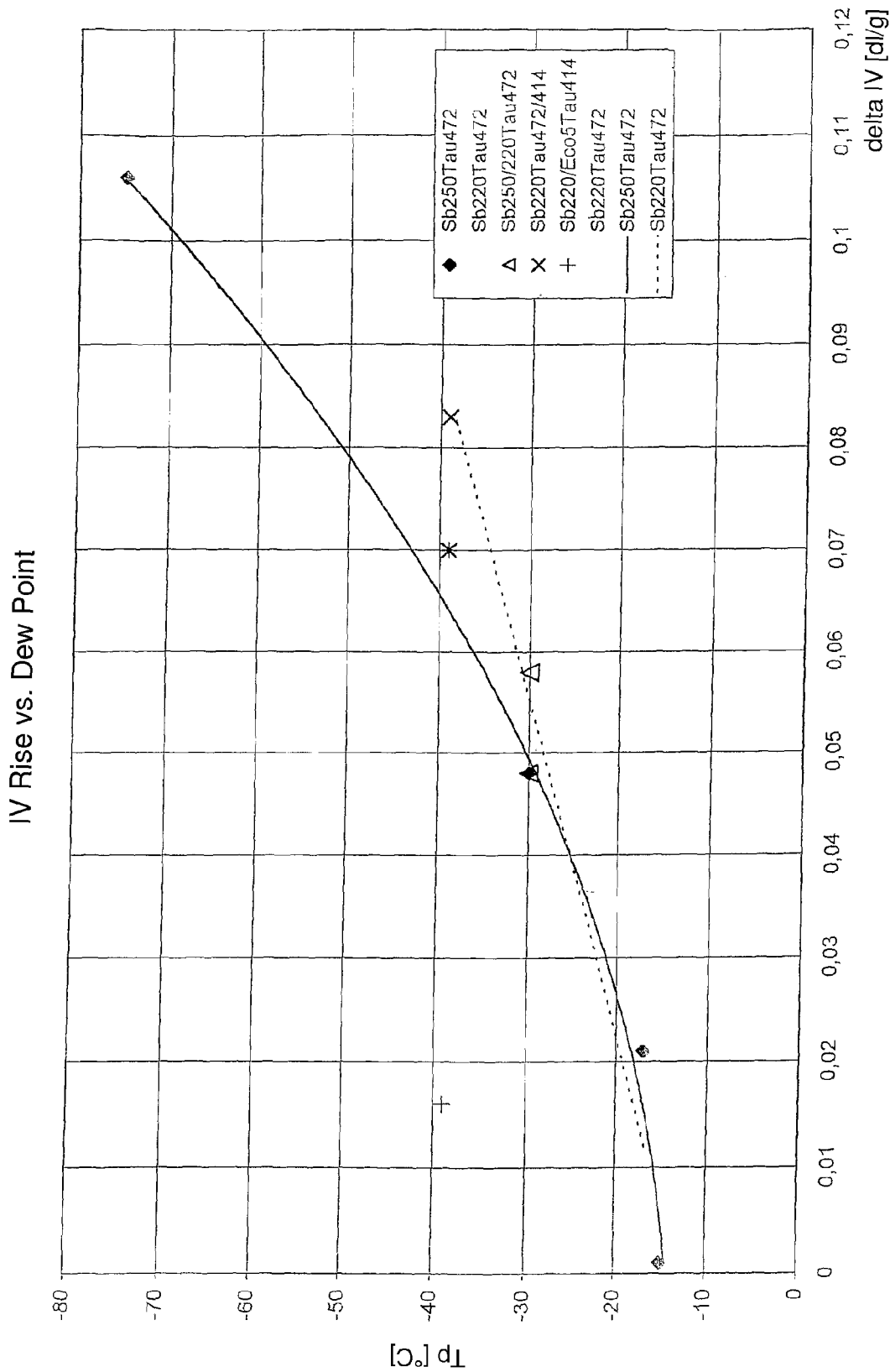
FIG. 3 shows a reaction curve of the I.V. development in dependence of the set dew points of the gas with constant antimony concentration in the PET and with a dwell time in the crystallisation of 445 min.

FIG. 3 shows a reaction curve of the I.V. development in dependence of the set dew points of the gas with constant antimony concentration in the PET and with a dwell time in the crystallisation of 445 min.

The granulate was prepared at 180° C. over 4 hours in a Challenger dryer for the production of preforms.

The processing to preforms occurred on a production machine of type Husky XL300P/48 cavities, giving 28 g preforms at 295° C. with the comparative product and under temperature reduction in the hot runner to 270-275° C. with processing of the chips from the method according to the invention.

The bottles were produced on a laboratory machine from Sidel with a tool with Coca Cola design under standard conditions.

The preform and bottle production ran without any problem. The transparency of the bottles was good and of neutral colour. The acetaldehyde content according to the usual head space method was with bottles following the method according to the invention between 1.0-2.5, mean 1.9 µg/l in comparison to bottles following the traditional solid state polycondensation with 2.5-3.1 µg/l. There was no difference in the mechanical properties of the bottles.

The invention claimed is:

1. Method of producing polyesters having a desired I.V. value, the method comprising:
    a) crystallizing a polyester material in two stages in the presence of a gas with a dew point of less than or equal to −10° C. in the two stages, the first stage being carried out at a lower temperature than the subsequent stage; and
    b) setting the dew point of the gas to a particular value to obtain a desired rise of I.V. value of the polyester of
        (i) about 0 dl/g to about 0.02 dl/g and the dew point of the gas is set to about −10° C. to about −20° C.;
        (ii) about 0.02 dl/g to about 0.04 dl/g and the dew point of the gas is set to about −15° C. to about −25° C.;

(iii) about 0.04 dl/g to about 0.06 dl/g and the dew point of the gas is set to about −20° C. to about −40° C.;
(iv) about 0.06 dl/g to about 0.08 dl/g and the dew point of the gas is set to about −30° C. to about −55° C.; or
(v) about 0.08 dl/g to about 0.1 dl/g and the dew point of the gas is set to about −45° C. to about −75° C.

2. Method according to claim 1, wherein the dew point lies in the range from approximately −10° C. to approximately −85° C.

3. Method according to claim 1, wherein the gas comprises air, nitrogen or a mixture of them.

4. Method according to claim 3, wherein the gas comprises nitrogen.

5. Method according to claim 1, wherein the intrinsic viscosity I.V. of the polyester material during the crystallisation rises by approximately 0 to approximately 0.11 dl/g.

6. Method according to claim 1, wherein the crystallisation is carried out at temperatures of approximately 150° C. to approximately 230° C.

7. Method according to claim 1, wherein the temperature during the crystallisation is continuously increased by up to approximately 20° C.

8. Method according to claim 1, wherein the crystallisation is carried out for up to approximately 10 h.

9. Method according to claim 1, wherein the crystallisation is carried out in more than two stages.

10. Method according to claim 1, wherein the $1^{st}$ stage of the crystallisation is carried out at a temperature of approximately 150° C. to approximately 210° C. and the $2^{nd}$ stage of the crystallisation is carried out at a temperature of approximately 180° C. to approximately 230° C.

11. Method according to claim 1, wherein the $1^{st}$ stage of the crystallisation is carried out for up to approximately 2 h and the $2^{nd}$ stage for up to approximately 8 h.

12. Method according to claim 1, wherein the $1^{st}$ stage of the crystallisation is carried out using a gas flow under turbulence.

13. Method according to claim 12, wherein the $1^{st}$ stage of the crystallisation is carried out in a fluidised bed reactor.

14. Method according to claim 1, wherein in the $2^{nd}$ stage of the crystallisation the polyester material flows (i) under mechanical disturbance and the gas in counterflow, (ii) under mechanical disturbance and the gas in uniflow and (iii) without mechanical disturbance and the gas in uniflow.

15. Method according to claim 14, wherein the $2^{nd}$ stage of the crystallisation is carried out in a shaft crystalliser.

16. Method according to claim 1, further comprising producing a polyester formed body from the polyester.

17. Method according to claim 16, wherein the polyester formed body is selected from the group consisting of bottles, films, filaments, fibres and technical high strength threads.

18. Method according to claim 16, wherein the polyester formed body is produced without carrying out a solid state polycondensation.

19. Method according to claim 1, wherein setting the dew point of less than or equal to −10° C. comprises mixing the gas with a moistened gas.

20. Method according to claim 1, wherein setting the dew point of less than or equal to −10° C. comprises dividing a moist gas from a stage in the production of polyesters into a first flow and a second flow, drying the first flow, and combining the first flow and the second flow.

* * * * *